(12) United States Patent
Thompson (10) Patent No.: US 12,022,762 B2
(45) Date of Patent: Jul. 2, 2024

(54) SYSTEM AND METHOD FOR CONTROLLING FAN OPERATION OF AN AGRICULTURAL IMPLEMENT

(71) Applicant: CNH Industrial Canada, Ltd., Saskatoon (CA)

(72) Inventor: Dennis George Thompson, Eagle Ridge (CA)

(*) Notice: Subject to any disclaimer, the term of this patent is extended or adjusted under 35 U.S.C. 154(b) by 317 days.

(21) Appl. No.: 17/564,916

(22) Filed: Dec. 29, 2021

(65) Prior Publication Data

US 2023/0200291 A1 Jun. 29, 2023

(51) Int. Cl.
| | | |
|---|---|---|
| B65G 53/14 | (2006.01) | |
| A01C 7/06 | (2006.01) | |
| A01C 7/08 | (2006.01) | |
| A01C 15/04 | (2006.01) | |

(52) U.S. Cl.
CPC ............... *A01C 15/04* (2013.01); *A01C 7/06* (2013.01); *A01C 7/082* (2013.01)

(58) Field of Classification Search
None
See application file for complete search history.

(56) References Cited

U.S. PATENT DOCUMENTS

| | | | | |
|---|---|---|---|---|
| 2,919,160 A | * | 12/1959 | Blackburn | B65G 53/22 406/134 |
| 3,194,539 A | * | 7/1965 | Hanne-Wiame | C21C 7/0037 406/137 |
| 3,288,537 A | * | 11/1966 | Hitch | B65G 53/00 406/120 |
| 3,345,111 A | * | 10/1967 | Bies | B05B 7/1472 406/138 |
| 3,693,840 A | * | 9/1972 | Starr | B65G 53/12 406/129 |

(Continued)

FOREIGN PATENT DOCUMENTS

| | | | |
|---|---|---|---|
| CA | 2993531 | 4/2017 | |
| WO | WO-2017059954 A2 * | 4/2017 | ........... B65D 88/548 |

OTHER PUBLICATIONS

Bourgault, Bourgault 2022 Product Catalog, Jun. 2021, 144 pages https://www.bourgault.com/ProductsEquipment/ProductCatalogues/tabid/416/language/en-US/Default.aspx.

*Primary Examiner* — Joseph A Dillon, Jr.
(74) *Attorney, Agent, or Firm* — Rebecca L. Henkel; Peter K. Zacharias; Rickard K. DeMille (57) ABSTRACT

A system for controlling fan operation of an agricultural implement includes a tank configured to store an agricultural product and a conduit configured to receive the dispensed agricultural product. Furthermore, the implement includes a conduit fan configured to supply pressurized air to the conduit such that the pressurized air conveys the dispensed agricultural product through the conduit and a tank fan configured to supply pressurized air to the tank. Additionally, a computing system is configured to determine a first pressure of the pressurized air within the conduit and a second pressure of the pressurized air within the tank based. Moreover, the computing system is configured to determine a pressure differential between the first and second pressures. Furthermore, the computing system is configured to control a flow of the pressurized air supplied to the tank based on the determined pressure differential.

20 Claims, 7 Drawing Sheets

(56) References Cited

U.S. PATENT DOCUMENTS

| | | | | |
|---|---|---|---|---|
| 3,933,394 | A * | 1/1976 | Klein | B65G 53/14 |
| | | | | 406/138 |
| 4,280,419 | A * | 7/1981 | Fischer | A01C 7/044 |
| | | | | 406/137 |
| 5,494,381 | A * | 2/1996 | Heyl | B65G 53/66 |
| | | | | 406/146 |
| 5,592,889 | A | 1/1997 | Bourgault | |
| 6,447,215 | B1 * | 9/2002 | Wellmar | B65G 53/66 |
| | | | | 406/122 |
| 6,782,835 | B2 | 8/2004 | Lee et al. | |
| 6,994,038 | B2 | 2/2006 | Mariman et al. | |
| 8,695,396 | B2 * | 4/2014 | Landphair | A01C 7/081 |
| | | | | 73/1.16 |
| 8,936,416 | B2 * | 1/2015 | Stutz, Jr. | B24C 9/00 |
| | | | | 406/137 |
| 9,179,594 | B2 | 11/2015 | Graham | |
| 9,733,634 | B2 * | 8/2017 | Prickel | A01C 7/081 |
| 9,739,654 | B2 * | 8/2017 | Binsirawanich | G01F 9/00 |
| 10,246,274 | B2 * | 4/2019 | Bent | B65G 53/4633 |
| 10,421,625 | B2 * | 9/2019 | Henry | A01C 7/082 |
| 10,479,618 | B2 * | 11/2019 | Gervais | A01C 7/102 |
| 10,549,932 | B2 * | 2/2020 | Henry | A01C 7/206 |
| 10,674,656 | B2 * | 6/2020 | Schoeny | A01C 21/005 |
| 10,942,053 | B2 | 3/2021 | Nedved et al. | |
| 11,136,204 | B2 * | 10/2021 | Gervais | B65G 53/66 |
| 11,305,951 | B2 * | 4/2022 | Harmon | B65G 53/56 |
| 2019/0152723 | A1 * | 5/2019 | Bent | B65G 53/04 |
| 2020/0053955 | A1 | 2/2020 | Borkgren et al. | |
| 2021/0300692 | A1 * | 9/2021 | Harmon | A01C 7/081 |
| 2022/0248593 | A1 * | 8/2022 | Ryder | A01C 7/082 |
| 2023/0039311 | A1 * | 2/2023 | Thompson | A01C 7/105 |

* cited by examiner

SYSTEM AND METHOD FOR CONTROLLING FAN OPERATION OF AN AGRICULTURAL IMPLEMENT

FIELD OF THE INVENTION

The present disclosure generally relates to agricultural implements and, more particularly, to systems and methods for controlling fan operation of an agricultural implement.

BACKGROUND OF THE INVENTION

Modern farming practices strive to increase yields of agricultural fields. In this respect, agricultural implements are towed behind a tractor or other work vehicle to perform an agricultural operation on the field. For example, seeders or other seed-planting implements distribute seed and fertilizer into the soil while being towed across the field. Specifically, a seeder typically includes one or more ground-engaging tools or openers that form a furrow or trench in the soil. One or more dispensing devices of the seeder may, in turn, deposit the seeds into the furrow(s). After deposition of the seeds, a packer wheel may pack the soil on top of the deposited seeds.

Typically, an air cart is used to meter and deliver seeds to the dispensing devices of the seeder. More specifically, the air cart generally includes one or more tanks or hoppers for storing the seeds or other agricultural products. In this respect, the air cart may include a fan that generates a flow of pressurized air used to pressurize the tank(s) and convey the seeds dispensed by from tank(s) to the dispensing devices of the seeder.

However, different locations on the air cart require pressurized air at differing pressures. As such, a complex arrangement of tubes and hoses having varying diameters is used to ensure that the flow of pressurized air generated by the fan is provided to each location on the air cart at the correct pressure. Specifically, the tube/hose diameters are selected to maintain adequate air velocity and, therefore, particle velocity. The fan operates in a region that generates sufficient static pressure and air velocity to reliably convey the granular agricultural products to the ground-engaging tools. The tools that are further away from the fan require more pressure to convey the agricultural product a longer distance. Depending on the how evenly the air is divided from the fan and static pressure in individual primary lines, the fan may have to run at a higher speed than necessary to ensure all lines have enough flow and pressure to convey the product.

Accordingly, an improved system and method for controlling fan operation of an agricultural implement would be welcomed in the technology. In particular, an improved system and method for controlling fan operation of an agricultural implement that eliminates the need for t the fan to run at unnecessarily high loads would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling fan operation of an agricultural implement. The system includes a tank configured to store an agricultural product and a conduit configured to receive the dispensed agricultural product. Furthermore, the agricultural implement includes a conduit fan configured to supply pressurized air to the conduit such that the pressurized air conveys the dispensed agricultural product through the conduit and a tank fan configured to supply pressurized air to the tank. Additionally, the agricultural implement includes a first pressure sensor configured to capture data indicative of a first pressure of the pressurized air within the conduit, a second pressure sensor configured to capture data indicative of a second pressure of the pressurized air within the tank, and a computing system communicatively coupled to the first and second pressure sensors. In this respect, the computing system is configured to determine the first pressure of the pressurized air within the conduit based on the data captured by the first pressure sensor. Moreover, the computing system is configured to determine the second pressure of the pressurized air within the tank based on the data captured by the second pressure sensor. In addition, the computing system is configured to determine a pressure differential between the first and second pressures. Furthermore, the computing system is configured to control a flow of the pressurized air supplied to the tank based on the determined pressure differential.

In another aspect, the present subject matter is directed to a method for controlling fan operation of an agricultural implement. The agricultural implement, in turn, includes a tank configured to store an agricultural product, a conduit configured to receive the agricultural product dispensed from the tank, and a conduit fan configured to supply pressurized air to the conduit such that the pressurized air conveys the dispensed agricultural product through the conduit. The agricultural implement further includes a tank fan configured to supply pressurized air to the tank. The method includes receiving, with a computing system, first pressure sensor data indicative of a first pressure of the pressurized air within the conduit. Furthermore, the method includes determining, with the computing system, the first pressure of the pressurized air within the conduit based on the received first pressure sensor data. Additionally, the method includes receiving, with the computing system, second pressure sensor data indicative of a second pressure of the pressurized air within the tank. Moreover, the method includes determining, with the computing system, the second pressure of the pressurized air within the tank based on the received second pressure data. In addition, the method includes determining, with the computing system, a pressure differential between the first and second pressures. Furthermore, the method includes controlling, with the computing system, a flow of the pressurized air supplied to the tank based on the determined pressure differential.

In a further aspect, the present subject matter is directed to an agricultural implement. The agricultural implement includes a tank configured to store an agricultural product and a conduit configured to receive the dispensed agricultural product. Additionally, the agricultural implement includes a conduit fan configured to supply pressurized air to the conduit such that the pressurized air conveys the dispensed agricultural product through the conduit and to supply the pressurized air to the tank. Moreover, the agricultural implement includes a valve configured to control a flow of the pressurized air from the conduit fan to the tank. In addition, the agricultural implement includes a first pressure sensor configured to capture data indicative of a first pressure of the pressurized air within the conduit, a second pressure sensor configured to capture data indicative of a second pressure of the pressurized air within the tank, and a computing system communicatively coupled to the first and second pressure sensors. In this respect, the computing system is configured to determine the first pressure of the pressurized air within the conduit based on the data captured by the first pressure sensor. Furthermore, the computing system is configured to determine the second pressure of the pressurized air within the tank based on the data captured by the second pressure sensor. Addition, the computing system is configured to determine a pressure differential between the first and second pressures. Furthermore, the computing system is configured to control an operation of the valve to adjust the flow of the pressurized air supplied to the tank based on the determined pressure differential.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and a method for controlling fan operation of an agricultural implement. As will be described below, the implement generally includes a tank or a hopper configured to store an agricultural product (e.g., seeds, fertilizer, etc.) and a conduit configured to receive the agricultural product dispensed from the tank. For example, the agricultural product may be dispensed from the tank at a predetermined metering rate by a metering device. Furthermore, the implement includes a conduit fan configured to supply pressurized air to the conduit such that the pressurized air conveys the dispensed agricultural product through the conduit. Additionally, the implement includes a tank fan that is separate from the conduit fan and configured to supply pressurized air to the tank.

In several embodiments, a computing system of the disclosed system is configured to control the flow of pressurized air to the tank. Specifically, in such embodiments, the computing system is configured to determine a first pressure of the pressurized air within the conduit based on received first pressure sensor data. Moreover, the computing system is configured to determine a second pressure of the pressurized air within the tank based on received second pressure sensor data. In addition, the computing system is configured to determine a differential between the first and second pressures. Thereafter, the computing system is configured to control the flow of the pressurized air supplied to the tank based on the determined pressure differential. For example, when the determined pressure differential falls outside of a predetermined range, the computing system may initiate an adjustment of the flow of the pressurized air supplied to the tank, such as by controlling the operation of the tank fan (e.g., by adjusting the fan speed) or a valve positioned between the tank fan and the tank.

Controlling the flow of pressurized air from the tank fan to the tank based on the pressure differential between the tank and the conduit improves the operation of the agricultural implement. More specifically, to dispense the agricultural product from the tank at the desired metering rate, it is generally necessary that the pressure differential between the tank and the conduit be within a predetermined range. In this respect, by controlling the flow of pressurized air to the tank based on the determined pressure differential, the disclosed system and method ensure that the agricultural product is dispensed from the tank at the desired metering rate. Moreover, the use of a separate tank fan to supply pressurized air to the tank eliminates the need for the conduit fan to operate at unnecessarily high loads to provide the agricultural product to the ground-engaging tools (e.g., the openers) of the implement.

Figure 1:
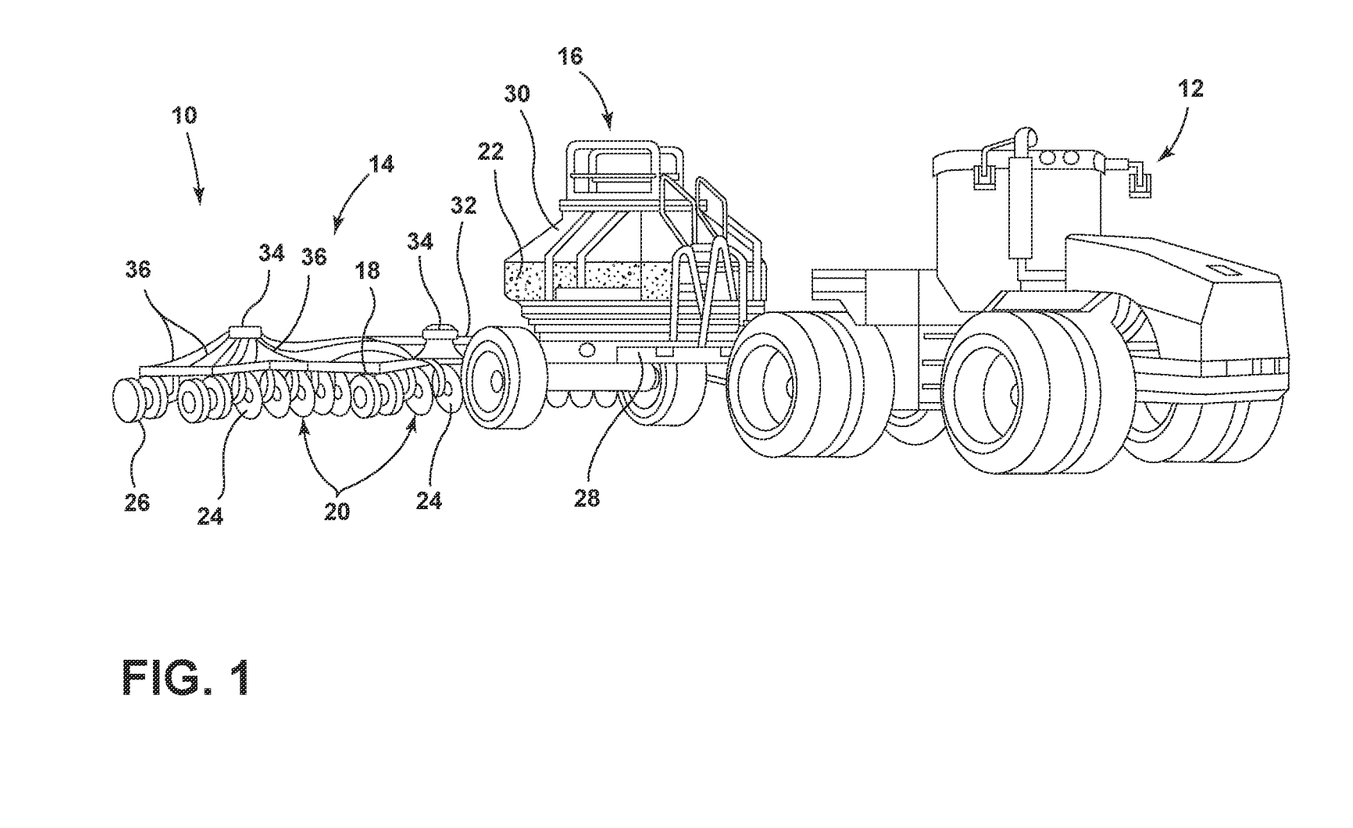
FIG. 1 illustrates a side view of one embodiment of an agricultural implement and an associated work vehicle in accordance with aspects of the present subject matter.

Referring now to the drawings, FIG. 1 illustrates a side view of one embodiment of an agricultural implement 10 coupled to a work vehicle 12. As shown, the implement 10 is configured as a seed-planting device 14 and an air cart 16. Furthermore, as shown, the work vehicle 12 may be configured as an agricultural tractor. However, in other embodiments, the implement 10 may be configured as any other suitable type of implement, such as another seed-dispensing implement, a side dresser or another fertilizer dispensing implement, a strip tiller, and/or the like. Similarly, in alternative embodiments, the work vehicle 12 may be configured as any other suitable type of vehicle, such as an agricultural harvester, a self-propelled sprayer, and/or the like.

As shown, the air cart 16 is configured to be towed directly behind the work vehicle 12, with the seed-planting device 14 being towed behind the air cart 16. However, in alternative embodiments, the seed-planting device 14 may be towed directly behind the work vehicle 12, with the air cart 16 being towed behind the seed-planting device 14. In a further embodiment, the air cart 16 and the seed planting device 14 may be part of a single unit that is towed behind the work vehicle 12, or elements of a self-propelled vehicle configured to distribute agricultural product across a field.

In several embodiments, the seed-planting device 14 may include a frame 18 configured to support or couple to various components of the seed-planting device 14, such as one or more ground-engaging tools 20. In general, the ground-engaging tool(s) 20 may be configured to excavate a furrow or trench in the soil to facilitate deposition of a flowable, granular or particulate-type agricultural product 22, such as seeds, fertilizer, and/or the like. For example, in the embodiment illustrated in FIG. 1, each ground-engaging tool 20 is configured as an opener disk 24. However, in alternative embodiments, the ground-engaging tool 20 may be configured as any suitable device for creating a furrow in the soil suitable for receiving the agricultural product 22, such as hoe or shank (not shown). Moreover, in some embodiments, the seed-planting device 14 may also include one or more closing wheels or disks 24 configured to close the furrow after the agricultural product 22 has been deposited into the furrow.

In general, the air cart 16 is configured to store the agricultural product 22 to be deposited within the soil. Specifically, in several embodiments, the air cart 16 may include a frame 28 configured to support or couple to various components of the air cart 16. For example, the frame 28 supports one or more tanks or hoppers 30 configured to storing the agricultural product 22 to be deposited within the furrow. In addition, the frame 28 may also be configured to support other components of the air cart 16, such as conduit fan 102 (FIG. 2).

Furthermore, one or more conduit(s) 32 of the implement 10 may be configured to transport the agricultural product 22 dispensed from the tank(s) 30 on the air cart 16 to the seed-planting device 14 for deposition into the furrow. Specifically, as will be described below, pressurized air supplied by the conduit fan 102 may convey the agricultural product 22 through the conduit(s) 32 to one or more headers or manifolds 34 on the seed-planting device 14. Thereafter, the agricultural product 22 may flow from the header(s) 34 to secondary tubes 36 to a plurality of dispensing devices (not shown) for deposition into the furrows. Alternatively, the conduit(s) 32 may be directly coupled to the ground-engaging tools 20 without the header(s) 34.

Figure 2:
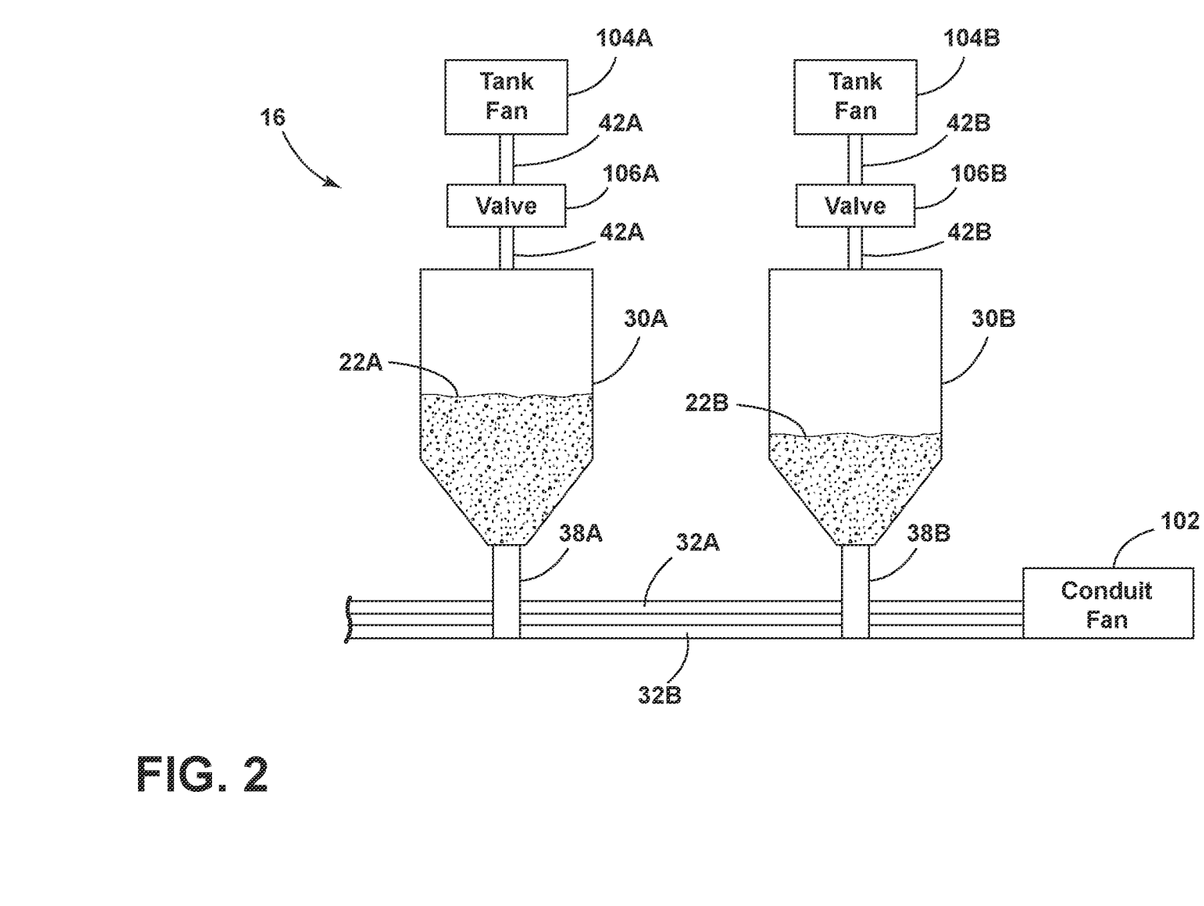
FIG. 2 illustrates a diagrammatic view of one embodiment of an agricultural implement in accordance with aspects of the present subject matter, particularly illustrating the agricultural implement including a conduit fan and a plurality of tank fans.

FIG. 2 illustrates a diagrammatic view of one embodiment of the air cart 16. In general, as mentioned above, the air cart 16 includes one or more tanks 30 configured to store one or more agricultural products. For example, as shown, in the illustrated embodiment, the air cart 16 includes a first tank 30A configured to store a first agricultural product 22A and a second tank 30B configured to store a second agricultural product 22B. In one embodiment, the first and second tanks 30A, 30B may store different agricultural products (e.g., one of tanks 30A, 30B may store seeds and the other tank 30A, 30B may store fertilizer). Alternatively, the first and second tanks 30A, 30B may store the same agricultural product. Additionally, in other embodiments, the air cart 16 may include any other suitable number of tanks 30, such as a single tank or three or more tanks.

Furthermore, the air cart 16 includes one or more metering devices. In general, each metering device is configured to dispense the agricultural product stored within one of the tanks at an adjustable metering rate. For example, as shown, in the illustrated embodiment, the air cart 16 includes a first metering device 38A configured to dispense the first agricultural product 22A stored within the first tank 30A. Additionally, in the illustrated embodiment, the air cart 16 includes a second metering device 38B configured to dispense the second agricultural product 22B stored within the second tank 30B. The metering device(s) may have any suitable structure for dispensing the agricultural product(s) stored within the tank(s) at a suitable metering rate(s).

Moreover, as mentioned above, the air cart 16 generally includes a plurality of conduits 32 configured to convey the agricultural product(s) dispensed from the tanks to seed-planting device 14 (FIG. 1). Specifically, as shown, in the illustrated embodiment, the air cart 16 includes a first conduit 32A and a second conduit 32B. In this respect, the first metering device 38A is configured to dispense the first agricultural product 22A from the first tank 30A into one of the first or second conduits 32A, 32B. Similarly, the second metering device 38B is configured to dispense the second agricultural product 22B from the second tank 30B into the other of first or second conduits 32A, 32B. For example, in certain instances, the first metering device 38A may dispense the first agricultural product 22A into the first conduit 32A and the second metering device 38B may dispense the second agricultural product 22B into the second conduit 32B. However, in alternative embodiments, the air cart 16 may include any other suitable number of conduits 32, such as a single delivery conduit or three or more delivery conduits.

In addition, the air cart 16 includes a conduit fan 102. In general, the conduit fan 102 is configured to supply pressurized air to the conduit(s) 32 such that the pressurized air conveys the dispensed agricultural product(s) through the conduit(s) 32. This pressurized air, in turn, conveys the agricultural product(s) dispensed by the metering device(s) through the conduit(s) 32 to the seed-planting device 14. For example, in the illustrated embodiment, the conduit fan 102 is configured to supply pressurized air to the first and second conduits 32A, 32B. Thus, the pressurized air generated by the conduit fan 102 may transport the first agricultural product 22A through the first conduit 32A and the second agricultural product 22B through the second conduit 32B. In this respect, the conduit fan 102 may have any suitable structure configured to generate a flow of pressurized air, such as a hydraulic fan or an electric fan.

Although FIG. 2 illustrates a single conduit fan 102, the air cart 16 may, in other embodiments, include a plurality of conduit fans 102. For example, in one embodiment, the air cart 16 may include two conduit fans 102 for supplying air flow/pressure at different levels for conveying seed and fertilizer separately. Typically, in such an embodiment, one conduit fan 102 may supply air flow at a first rate suitable for conveying seed only or a seed and fertilizer blend. The seed and fertilizer blend may, in turn, involve product from separate tanks 40 being dispensed into the same conduit 32. The other conduit fan 102 may be configured to convey fertilizer only which could be a blend of various types of fertilizer (e.g., N, P, K, etc.) from separate tanks 40. Thus, there could be two separate conveyance systems on a single air cart 16, with one system for conveying seed or seed/ fertilizer blend and the other system for conveying fertilizer only. Each system would have a dedicated conduit fan 102 operating at the level (e.g., flow/pressure) required to deliver agricultural product to the ground-engaging tool 20.

Furthermore, the air cart 16 includes one or more tank fans 104. In general, the tank fan(s) 104 is separate from the conduit fan 102 (i.e., a different source(s) of pressurized air) and configured to supply pressurized air to the tank(s) 30. More specifically, it may generally be necessary to maintain a range of pressure differentials between each tank 30 and the corresponding conduit into which the agricultural product 22 stored in that tank 30 is being dispensed. This range of pressure differentials, in turn, ensures that metering device(s) can dispense the agricultural product(s) 22 at the desired metering rate(s). For example, as mentioned above, in certain instances, the first agricultural product 22A stored in the first tank 30A is dispensed into the first conduit 32A and the second agricultural product 22B stored in the second tank 30B is dispensed into the second conduit 32B. In such instances, it may be necessary to maintain a range of pressure differentials between the first tank 30A and the first conduit 32A. Similarly, it may be necessary to maintain a range of pressure differentials between the second tank 30B and the second conduit 32B. As will be described below, the flow(s) of pressurized air from the tank fan(s) 104 to the tank(s) 30 may be controlled to maintain a predetermined range of pressure differentials between the tanks(s) and the corresponding conduit(s). The tank fan(s) 104 may have any suitable structure configured to generate a flow of pressurized air, such as a hydraulic fan(s) or an electric fan(s).

The use one or more tank fans 104 that are separate from the conduit fan 102 improves the operation of the air cart 16. Specifically, the use of a separate tank fan(s) 104 allows pressurized air to be supplied to each tank at varying pressures without the need for the complex arrangement of tubes and hoses having varying diameters.

In several embodiments, the air cart 16 may include a plurality of tank fans 104. Specifically, in such embodiments, each tank fan 104 is configured to supply pressurized air to one of the tanks 30. For example, in the illustrated embodiment, the air cart 16 includes a first tank fan 104A configured to supply pressurized air to the first tank 30A via a conduit 42A. Moreover, in the illustrated embodiment, the air cart 16 includes a second tank fan 104B configured to supply pressurized air to the second tank 30B via a conduit 42B. However, as will be described below, a single tank fan 104 may be configured to supply pressurized air to all of the tanks 30.

Additionally, in some embodiments, the air cart 16 may include one or more valves 106. In general, each valve 106 is configured to control the flow of pressurized air from the tank fan(s) 104 to one of the tanks 30. For example, in the illustrated embodiment, the air cart 16 includes a first valve 106A configured to control the flow of the pressurized air supplied by the first tank fan 104A to the first tank 30A. Similarly, in the illustrated embodiment, the air cart 16 includes a second valve 106B configured to control the flow of the pressurized air supplied by the second tank fan 104B to the second tank 30B. Thus, in the illustrated embodiment, the operation of the tank fans 104A, 104B and/or the valve 106A, 106B may be controlled to adjust the flows of pressurized air to the tanks 30A, 30B. However, in alternative embodiment, the air cart 16 may not include the valve(s) 106. In such embodiments, the operation of the tank fans 104A, 104B may be solely controlled to adjust the flows of pressurized air to the tanks 30A, 30B.

Figure 3:
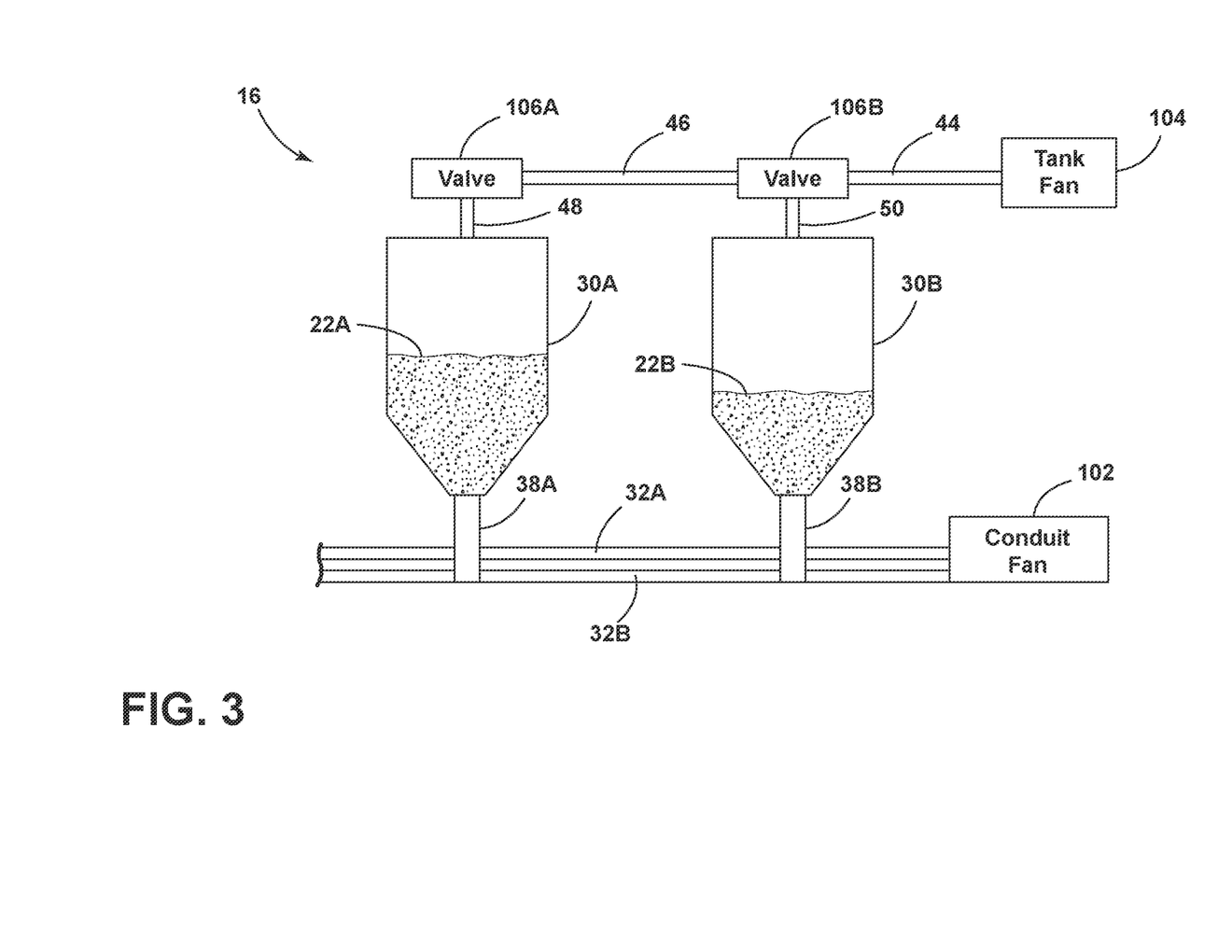
FIG. 3 illustrates a diagrammatic view of another embodiment of an agricultural implement in accordance with aspects of the present subject matter, particularly illustrating the agricultural implement including a conduit fan and a single tank fan.

FIG. 3 illustrates a diagrammatic view of another embodiment of the air cart 16. In general, the air cart 16 of FIG. 3 is configured similarly to the air cart 16 of FIG. 2. For example, like the air cart 16 of FIG. 2, the air cart 16 of FIG. 3 includes the first and second tanks 30A, 30B; the first and second metering devices 38A, 38B; the first and second conduits 32A, 32B; and the conduit fan 102. However, unlike the air cart 16 of FIG. 2, the air cart 16 of FIG. 3 includes only a single tank 104. In such an embodiment, the tank fan 104 is configured to supply pressurized air to both of the first and second tanks 30A, 30B via conduits 44, 46, 48, 50. As such, the air cart 16 includes a plurality of valves 106 configured to control the flow of the pressurized air supplied by the tank fan 104 to the tanks 30. For example, in the illustrated embodiment, the air cart 16 includes a first valve 106A configured to control the flow of the pressurized air supplied by the tank fan 104 to the first tank 30A. Furthermore, in the illustrated embodiment, the air cart 16 includes a second valve 106B configured to control the flow of the pressurized air supplied by the tank fan 104 to the second tank 30B. Moreover, the first and second valves 106A, 106B may be independently controllable. Thus, by independently controlling the operation of the first and second valves 106A, 106B, the single tank fan 104 may pressurize the first and second tanks 30A, 30B to differing pressures.

Figure 4:
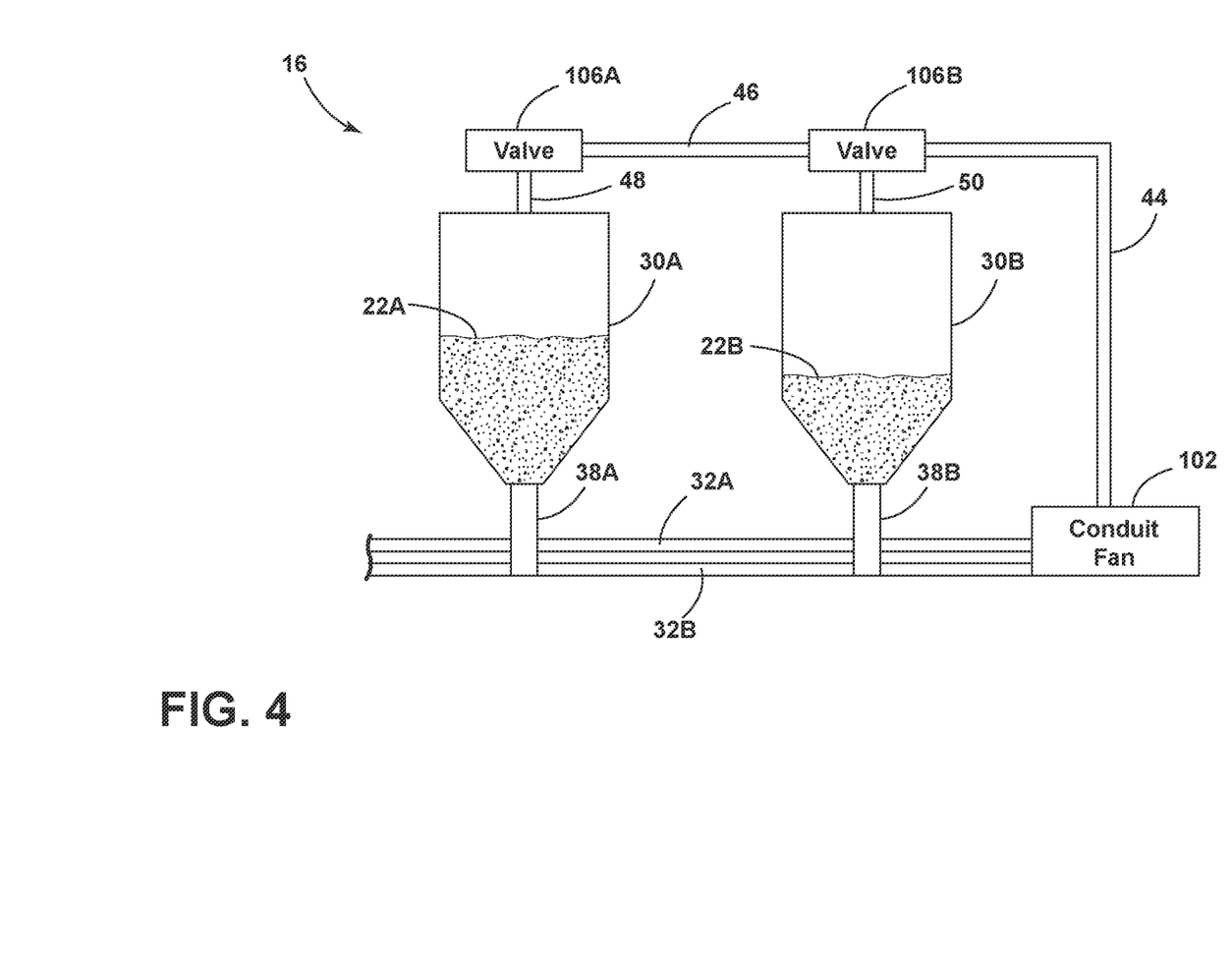
FIG. 4 illustrates a diagrammatic view of a further embodiment of an agricultural implement in accordance with aspects of the present subject matter, particularly illustrating the agricultural implement including a conduit fan.

FIG. 4 illustrates a diagrammatic view of further embodiment of the air cart 16. In general, the air cart 16 of FIG. 4 is configured similarly to the air cart 16 of FIG. 3. For example, like the air cart 16 of FIG. 3, the air cart 16 of FIG. 4 includes the first and second tanks 30A, 30B; the first and second metering devices 38A, 38B; the first and second conduits 32A, 32B; the conduit fan 102; the first and second valves 106A, 102B; and the conduits 44, 46, 48, 50. However, unlike the air cart 16 of FIG. 3, the air cart 16 of FIG. 4 does not include a tank fan 104. Instead, the conduit fan 102 is configured to supply pressurized air to the first and second tanks 30A, 30B in addition to the first and second conduits 32A, 32B. Specifically, in such an embodiment, the conduit fan 102 supplies pressurized air directly to the conduit 44 for eventual delivery to the first and second tanks 30A, 30B. As such, in the illustrated embodiment, the first valve 106A is configured to control the flow of the pressurized air supplied by the conduit fan 102 to the first tank 30A. Furthermore, in the illustrated embodiment, the second valve 106B is configured to control the flow of the pressurized air supplied by the conduit fan 102 to the second tank 30B. Moreover, the first and second valves 106A, 106B may be independently controllable. Thus, by independently controlling the operation of the first and second valves 106A, 106B, the conduit fan 102 may pressurize the first and second tanks 30A, 30B and the first and second conduits 32A, 32B to differing pressures using pressurized air generated by the conduit fan 102.

The configuration of the implement 10 and the work vehicle 12 described above and shown in FIG. 1-4 is provided only to place the present subject matter in an exemplary field of use. Thus, it should be appreciated that the present subject matter may be readily adaptable to any manner of work vehicle, air cart, and/or implement configuration.

Figure 5:
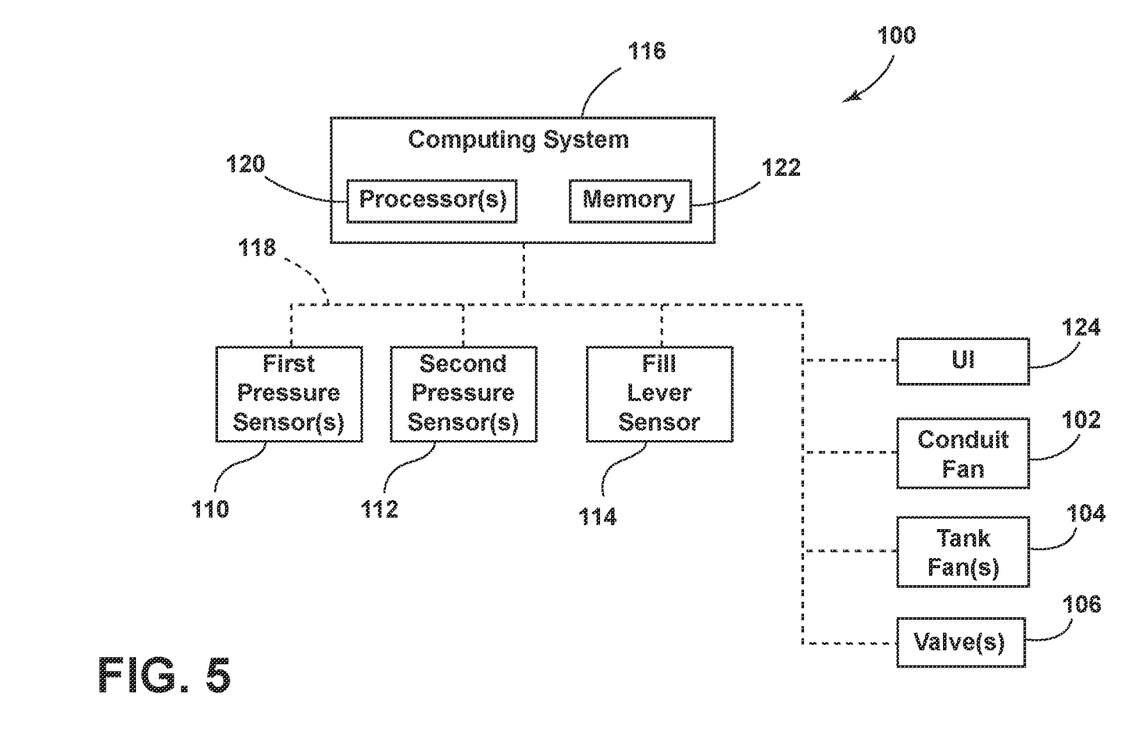
FIG. 5 illustrates a schematic view of one embodiment of a system for controlling fan operation of an agricultural implement in accordance with aspects of the present subject matter.

Referring now to FIG. 5, a schematic view of one embodiment of a system 100 for controlling fan operation of an agricultural implement is illustrated in accordance with aspects of the present subject matter. In general, the system 100 will be described herein with reference to the agricultural implement 10 and the work vehicle 12 described above with reference to FIGS. 1-4. However, the disclosed system 100 may generally be utilized with agricultural implements having any other suitable implement configuration and/or work vehicles having any other suitable vehicle configuration.

As shown in FIG. 5, the system 100 includes one or more components of the agricultural implement 10 and, more specifically, of the air cart 16. For example, in the illustrated embodiment, the system 100 includes the conduit fan 102, the tank fan(s) 104, and the valve(s) 106. However, in alternative embodiments, the system 100 may include any other suitable components of the implement 10.

Furthermore, the system 100 may include one or more first pressure sensors 110. In general, each first pressure sensor 110 is configured to capture data indicative of a first pressure of the pressurized air within one of the conduits 32. As such, the first pressure sensor(s) 110 may be provided in fluid communication with the conduit(s) 32. For example, in an embodiment in which the air cart 16 includes the first and second conduits 32A, 32B (e.g., the embodiments shown in FIGS. 2-4), the system 100 may include one first pressure sensor 110 configured to capture data indicative of the pressure within the first conduit 32A and another first pressure sensor 110 configured to capture data indicative of the pressure within the second conduit 32B.

Additionally, the system 100 may include one or more second pressure sensors 112. In general, each second pressure sensor 112 is configured to capture data indicative of a second pressure of the pressurized air within one of the tanks 30. As such, the second pressure sensor(s) 112 may be provided in fluid communication with the volume of the tanks(s) 30 positioned above the top surface(s) of the agricultural product(s) 22. For example, in an embodiment in which the air cart 16 includes the first and second tanks 30A, 30B (e.g., the embodiments shown in FIGS. 2-4), the system 100 may include one second pressure sensor 110 configured to capture data indicative of the pressure within the first tank 30A and another second pressure sensor 110 configured to capture data indicative of the pressure within the second tank 30B.

Each first and second pressure sensors 110, 112 may correspond to any suitable type of sensing device configured to capture pressure data. For example, the first and second pressure sensor 110, 112 may correspond to diaphragm pressure sensors, piston pressure sensors, strain gauge-based pressure sensors, electromagnetic pressure sensors, and/or the like.

Moreover, in several embodiments, the system 100 may include one or more fill level sensors 114. In general, each fill level sensor 114 is configured capture data indicative of the fill level of the agricultural product 22 within one of the tanks 30. For example, in an embodiment in which the air cart 16 includes the first and second tanks 30A, 30B (e.g., the embodiments shown in FIGS. 2-4), the system 100 may include a first fill level sensor 114 configured to capture data indicative of the fill level of the first agricultural product 22A within the first tank 30A. Furthermore, in such embodiments, the system 100 may include a second fill level sensor 114 configured to capture data indicative of the fill level of the second agricultural product 22B within the second tank 30B.

The fill level sensor(s) 114 may correspond to any suitable type of sensing device(s) configured to capture fill level data. For example, the fill level sensor(s) 114 may correspond to an optical sensor(s), a switch-based sensor(s), a load cell(s), and/or the like.

In addition, the system 100 includes a computing system 116 communicatively coupled to one or more components of the implement 10, the vehicle 12, and/or the system 100 to allow the operation of such components to be electronically or automatically controlled by the computing system 116. For instance, the computing system 116 may be communicatively coupled to the sensors 110, 112, 114 via a communicative link 118. As such, the computing system 116 may be configured to receive data from the sensors 110, 112, 114 that is indicative of various operating parameters of the implement 10. Furthermore, the computing system 116 may be communicatively coupled to various components of the implement 10, such as the conduit fan 102, the tank fan(s) 104, and/or the valve(s) 106, via the communicative link 118. In this respect, the computing system 116 may be configured to control the operation of such components 102, 104, 106 (e.g., to adjust the flow(s) of pressurized air being supplied to the tank(s) 30 of the air cart 16). Moreover, the computing system 116 may be communicatively coupled to any other suitable components of the implement 10, the vehicle 12, and/or the system 100.

In general, the computing system 116 may comprise one or more processor-based devices, such as a given controller or computing device or any suitable combination of controllers or computing devices. Thus, in several embodiments, the computing system 116 may include one or more processor(s) 120 and associated memory device(s) 122 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 122 of the computing system 116 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 122 may generally be configured to store suitable computer-readable instructions that, when implemented by the processor(s) 120, configure the computing system 116 to perform various computer-implemented functions, such as one or more aspects of the methods and algorithms that will be described herein. In addition, the computing system 116 may also include various other suitable components, such as a communications circuit or module, one or more input/output channels, a data/control bus and/or the like.

The various functions of the computing system 116 may be performed by a single processor-based device or may be distributed across any number of processor-based devices, in which instance such devices may be considered to form part of the computing system 116. For instance, the functions of the computing system 116 may be distributed across multiple application-specific controllers or computing devices, such as a navigation controller, an engine controller, a transmission controller, an implement controller, and/or the like.

Furthermore, the system 100 may also include a user interface 124. More specifically, the user interface 124 may be configured to receive inputs (e.g., inputs associated with an operating parameter(s) of the air cart 16) from the operator. As such, the user interface 124 may include one or more input devices, such as touchscreens, keypads, touchpads, knobs, buttons, sliders, switches, mice, microphones, and/or the like, which are configured to receive inputs from the operator. The user interface 124 may, in turn, be communicatively coupled to the computing system 116 via the communicative link 118 to permit the received inputs to be transmitted from the user interface 124 to the computing system 116. In addition, some embodiments of the user interface 124 may include one or more feedback devices (not shown), such as display screens, speakers, warning lights, and/or the like, which are configured to provide feedback from the computing system 116 to the operator. In one embodiment, the user interface 124 may be mounted or otherwise positioned within a cab (not shown) of the vehicle 12. However, in alternative embodiments, the user interface 124 may mounted at any other suitable location.

Figure 6:
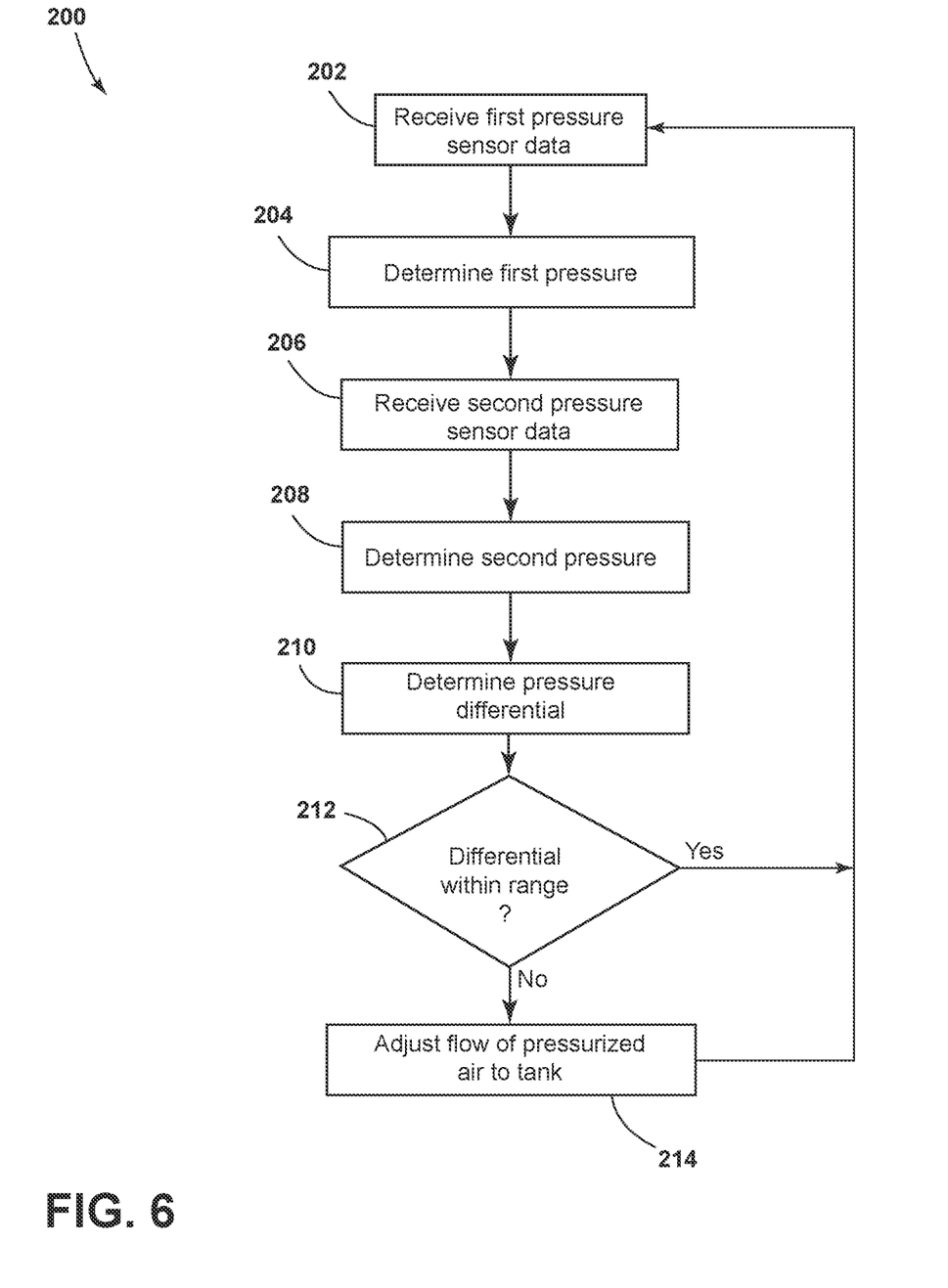
FIG. 6 illustrates a flow diagram providing one embodiment of control logic for controlling fan operation of an agricultural implement in accordance with aspects of the present subject matter.

Referring now to FIG. 6, a flow diagram of one embodiment of control logic 200 that may be executed by the computing system 116 (or any other suitable computing system) for controlling fan operation of an agricultural implement is illustrated in accordance with aspects of the present subject matter. Specifically, the control logic 200 shown in FIG. 6 is representative of steps of one embodiment of an algorithm that can be executed to control fan for a work vehicle to maintain a desired pressure differential(s) between the tank(s) and the conduit(s) of the implement. Thus, in several embodiments, the control logic 200 may be advantageously utilized in association with a system installed on or forming part of an agricultural implement to allow for real-time fan operation control without requiring substantial computing resources and/or processing time. However, in other embodiments, the control logic 200 may be used in association with any other suitable system, application, and/or the like for controlling fan operation of an agricultural implement.

As shown in FIG. 6, at (202), the control logic 200 includes receiving first pressure sensor data indicative of a first pressure of the pressurized air within a conduit of the agricultural implement. Specifically, as mentioned above, in several embodiments, the computing system 116 may be communicatively coupled to the first pressure sensor(s) 110 via the communicative link 118. In this respect, as the implement 10 travels across the field (e.g., to perform a seed-planting operation thereon), the computing system 116 may receive data from the first pressure sensor(s) 110. Such data may, in turn, be indicative of the pressure(s) within the conduit(s) 32 of the air cart 16.

Furthermore, at (204), the control logic 200 includes determining the first pressure of the pressurized air within the conduit based on the received first pressure sensor data. Specifically, in several embodiments, the computing system 116 may be configured to determine the first pressure(s) of the pressurized air within the conduit(s) 32 of the air cart 16 based on the first pressure sensor data received at (202). For example, in one embodiment, the computing system 116 may determine the pressure within the first conduit 32A and the pressure within the second conduit 32B based on the received first pressure data. In this respect, the computing system 116 may use a look-up table, any suitable mathematical formula(s), and/or the like to determine the first pressure(s) from the received first pressure sensor data.

Additionally, at (206), the control logic 200 includes receiving second pressure sensor data indicative of a second pressure of the pressurized air within a tank of the agricultural implement. Specifically, as mentioned above, in several embodiments, the computing system 116 may be communicatively coupled to the second pressure sensor(s) 112 via the communicative link 118. In this respect, as the implement 10 travels across the field (e.g., to perform the seed-planting operation thereon), the computing system 116 may receive data from the second pressure sensor(s) 112. Such data may, in turn, be indicative of the pressure(s) within the tank(s) 30 of the air cart 16.

Moreover, at (208), the control logic 200 includes determining the second pressure of the pressurized air within the tank based on the received second pressure sensor data. Specifically, in several embodiments, the computing system 116 may be configured to determine the second pressure(s) of the pressurized air within the tank(s) 30 of the air cart 16 based on the second pressure sensor data received at (206). For example, in one embodiment, the computing system 116 may determine the pressure within the first tank 30A and the pressure within the second tank 30B based on the received pressure data. In this respect, the computing system 116 may use a look-up table, any suitable mathematical formula(s), and/or the like to determine the second pressure(s) from the received second pressure sensor data.

In addition, at (210), the control logic 200 includes determining a pressure differential between the first and second pressures. Specifically, in several embodiments, the computing system 116 may be configured to determine the pressure differential between each pair of corresponding first and second pressures determined at (204) and (208). For example, in one embodiment, the computing system 116 may determine the pressure differential between the first pressure of the first conduit 32A and the second pressure of the first tank 30A. Moreover, in such an embodiment, the computing system 116 may also determine the pressure differential between the first pressure of the second conduit 32B and the second pressure of the second tank 30B. As will be described below, the flow of pressurized air to each tank 30 from the tank fan(s) 104 is controlled based on the corresponding pressure differential.

Furthermore, at (212), the control logic 200 includes comparing the determined differential between the first and second pressures to the predetermined range. Specifically, in several embodiments, the computing system 116 may compare each pressure differential determined at (210) to an associated predetermined range. When all of the determined pressure differentials are within the associated predetermined range(s), no adjustments to the flows of pressurized air to any of the tanks 30 is needed. In such instances, the control logic 200 returns to (202). Conversely, when one or more of the determined pressure differentials fall outside the associated predetermined range(s), the agricultural product 22 in the corresponding tank 30 may not be dispensed from the tank 30 at the selected or desired rate. In such instances, it may be necessary to adjust the flow(s) of pressurized air to the corresponding tank(s) 30 and, thus, the control logic 200 proceeds to (214).

Additionally, at (214), the control logic 200 includes initiating an adjustment to the flow of the pressurized air supplied to the tank. Specifically, in several embodiments, when it is determined that one or more of the determined pressure differentials fall outside the associated predetermined range(s) at (214), the computing system 116 may initiate an adjustment(s) to the flow(s) of the pressurized air supplied to the corresponding tank(s) 30. Such adjustments may, in turn, return the pressure differential to the corresponding predetermined range, thereby ensuring proper metering of the agricultural product(s) 22.

At (214), such adjustment(s) to the flow of pressurized air to the tank(s) 30 may be made by controlling the operation of the tank fan(s) 104. For example, as described above, in some embodiments (e.g., as shown in FIG. 2), each tank 30 may include a corresponding tank fan 104. In such embodiments, the computing system 116 may be configured to control the operation of the tank fan(s) 104 based on the determined pressure differential(s). For example, the computing system 116 may transmit control signals to the tank fan(s) 104 configured to supply pressurized air to the tank(s) 30 in which the corresponding pressure differential(s) is outside of the associated range(s). Upon receipt of the control signals, the tank fan(s) 104 may adjust the flow of pressurized air being generated, such as my increasing or decreasing fan speed.

Moreover, at (214), such adjustment(s) to the flow of pressurized air to the tank(s) 30 may be made by controlling the operation of the valve(s) 106. For example, as described above, in some embodiments (e.g., as shown in FIG. 3), a single tank fan 104 may supply pressurized air to a plurality of tanks 30. Alternatively, in other embodiments (e.g., as shown in FIG. 4), the conduit fan 104 may supply pressurized air to the plurality of tanks 30. In such embodiments, the computing system 116 may be configured to control operation of the valve(s) 106 based on the determined pressure differential(s). For example, the computing system 116 may transmit control signals to the valve(s) 106 configured to control the supply of pressurized air to the tank(s) 30 in which the corresponding pressure differential(s) is outside of the associated range(s). Upon receipt of the control signals, the valve(s) 106 may adjust the flow of pressurized air flowing to the tank(s) 30. Thus, the valve(s) 106 may be independently controllable. Furthermore, in one embodiment, the valve(s) 106 may be controlled in addition or as an alternative to controlling the tank fan(s) 104 when each tank 30 has a corresponding tank fan 104.

Additionally, in some embodiments, when it is determined that one or more of the determined pressure differentials fall outside the associated predetermined range(s) at (214) for a specified amount of time, the computing system 116 may initiate an associated notification or warning. Specifically, in such instances, the computing system 116 may transmit control signals to the user interface 124 via the communicative link 118. Such control signals may, in turn, instruct the user interface 124 to display or emit a visual and/or audible warning or notification indicating that the one or more of the determined pressure differentials have fallen outside the associated predetermined range(s).

In several embodiments, the flow of the pressurized air to the tank(s) 30 may be controlled based on one or more other parameters in addition to the determined pressure differential(s) and/or second pressure(s). For example, such other parameter(s) may be used to set and/or adjust the range(s) to which the pressure differential(s) is being compared. In addition, such other parameter(s) may be used to turn the tank fan(s) on and/off, such as when turning around at the end of a pass across the field.

In some embodiments, the flow of the pressurized air to the tank(s) 30 may be controlled based on the fill level(s) of the tank(s) 30 in addition to the determined pressure differential(s) and/or second pressure(s). More specifically, when the fill level of the agricultural product 22 within the tank 30 is low, high pressure within the tank 30 may cause some of the agricultural product 22 to blow by the corresponding metering device. Thus, as mentioned above, in several embodiments, the computing system 116 may be communicatively coupled to the fill level sensor(s) 114 via the communicative link 118. In this respect, as the implement 10 travels across the field (e.g., to perform the seed-planting operation thereon), the computing system 116 may receive data from the fill level sensor(s) 114. Moreover, the computing system 116 may determine the fill level(s) of the tank(s) 30 based on the received fill level data. Thereafter, the computing system 116 may control the operation of the tank fan(s) 104 and/or the valve(s) 106 based on the determined fill level(s) and the determined pressure differential(s) or second pressure(s) to ensure agricultural product blow-by does not occur.

Furthermore, in some embodiments, the flow of the pressurized air to the tank(s) 30 may be controlled based on the type(s) of the agricultural product(s) 22 stored within the tank(s) 30 in addition to the determined pressure differential(s) and/or second pressure(s). More specifically, when a tank 30 contains a fine agricultural product (e.g., canola seed), high pressure within the tank 30 may cause some of the agricultural product 22 to blow by the corresponding metering device. Thus, as mentioned above, in several embodiments, the computing system 116 may be communicatively coupled to the user interface 124 via the communicative link 118. In this respect, prior to performing the seed-planting operation, the operator of the implement/vehicle 10/12 may input the type (e.g., the plant species of the seed, fertilizer type/size, etc.), of the agricultural product 22 within each tank 30 to the user interface 124. As such, the computing system 116 may receive an input indicative of the type(s) of the agricultural product(s) 22 stored within the tank(s) 30 from the user interface 124. Thereafter, the computing system 116 may control the operation of the tank fan(s) 104 and/or the valve(s) 106 based on the agricultural product type(s) and the determined pressure differential(s) or second pressure(s) to ensure agricultural product blow-by does not occur.

Additionally, in some embodiments, the flow of the pressurized air to the tank(s) 30 may be controlled based on the metering rate(s) at which the agricultural product(s) 22 is dispensed from the tank(s) 30 in addition to the determined pressure differential(s). More specifically, if may be necessary to maintain a higher pressure differential when using higher metering rate rates and a lower pressure differential when using lower metering rates to ensure proper dispensing of the agricultural product. In this respect, prior to performing the seed-planting operation, the operator of the implement/vehicle 10/12 may input the metering rate(s) of the agricultural product(s) 22 being dispensed by the tank(s) 30 into the user interface 124. As such, the computing system 116 may receive an input indicative of the metering rate(s) of the agricultural product(s) stored within the tank(s) 30 from the user interface 124. Thereafter, the computing system 116 may control the operation of the tank fan(s) 104 and/or the valve(s) 106 based on the metering rate(s) and the determined pressure differential(s) to ensure proper dispensing of the agricultural product(s).

Moreover, in some embodiments, the flow of the pressurized air to the tank(s) 30 may be controlled based on the geometry of the tank(s) 30 in addition to the determined pressure differential(s). More specifically, the tank fan(s) 104 may be turned off when the implement/vehicle 10/12 turns around at the end of a pass across the field. As such, it may be necessary to turn the tank fan(s) 104 back on sooner to repressurize the tank(s) 30 when the tank(s) 30 has a greater volume(s) and/or an irregular shape(s). In this respect, prior to performing the seed-planting operation, the computing system 116 may access the volume(s), shape(s), and/or other geometric parameters of the tank(s) 30 stored with its memory device(s) 122. Thereafter, the computing system 116 may control the operation of the tank fan(s) 104 and/or the valve(s) 106 based on the volume(s), shape(s), and/or the like of the tank(s) 30 in addition to the determined pressure differential(s) to ensure proper pressurization and dispensing of the agricultural product(s) 22 when starting a new pass across the field.

Figure 7:
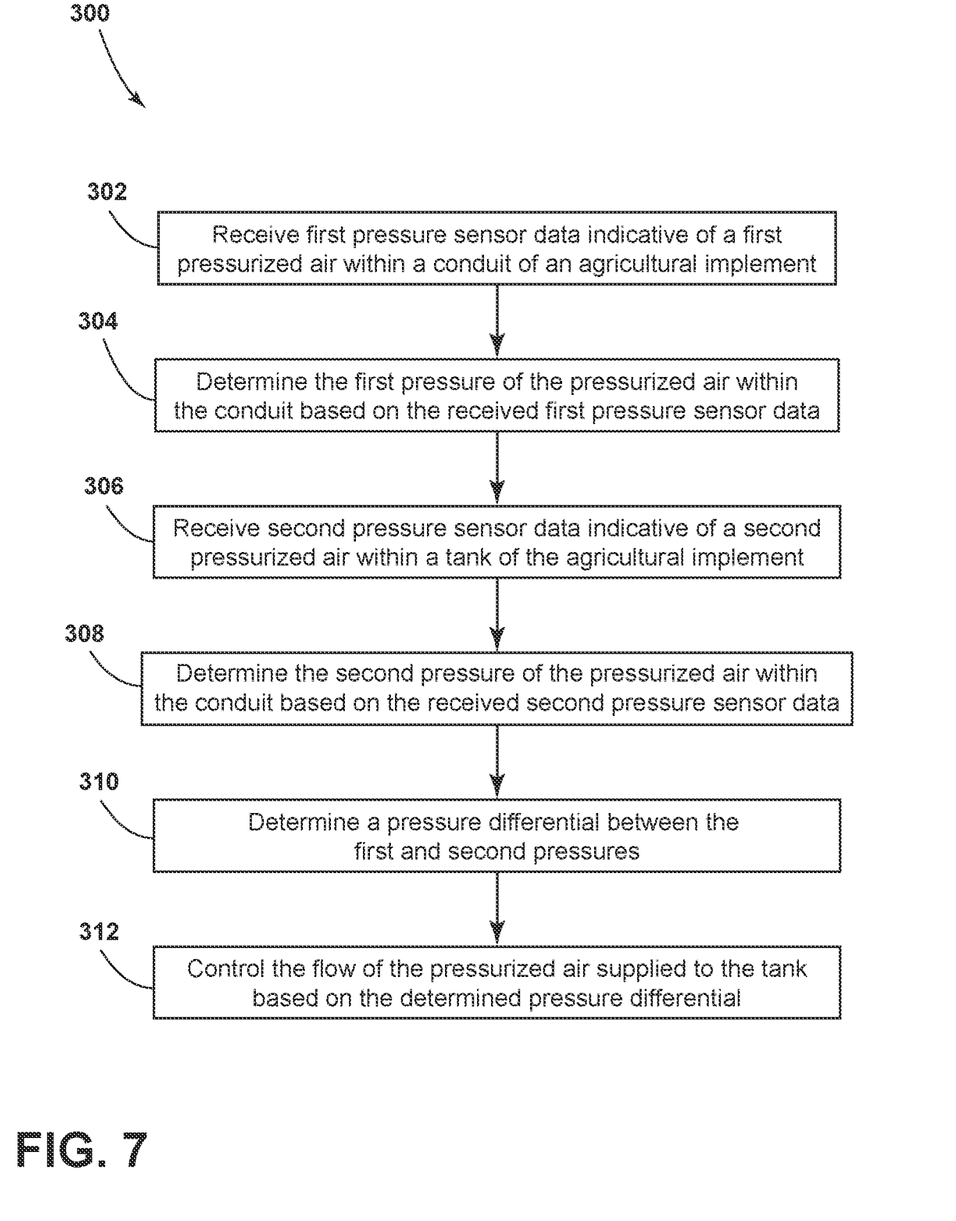
FIG. 7 illustrates a flow diagram of one embodiment of a method for controlling fan operation of an agricultural implement in accordance with aspects of the present subject matter.

Referring now to FIG. 7, a flow diagram of one embodiment of a method 300 for controlling fan operation of an agricultural implement is illustrated in accordance with aspects of the present subject matter. In general, the method 300 will be described herein with reference to the agricultural implement 10, the work vehicle 12, and the system 100 described above with reference to FIGS. 1-6. However, the disclosed method 300 may generally be implemented with any agricultural implement having any suitable implement configuration, with any work vehicle having any suitable vehicle configuration and/or any system having any suitable system configuration. In addition, although FIG. 7 depicts steps performed in a particular order for purposes of illustration and discussion, the methods discussed herein are not limited to any particular order or arrangement. As such, various steps of the methods disclosed herein can be omitted, rearranged, combined, and/or adapted in various ways without deviating from the scope of the present disclosure.

As shown in FIG. 7, at (302), the method 300 may include receiving, with a computing system, first pressure sensor data indicative of a first pressure of pressurized air within a conduit of an agricultural implement. For instance, as described above, the computing system 116 may be configured to receive first pressure sensor data indicative of first pressures of the pressurized air within the conduit(s) 32 from the first pressure sensors 110.

Additionally, at (304), the method 300 may include determining, with the computing system, the first pressure of the pressurized air within the conduit based on the received first pressure sensor data. For instance, as described above, the computing system 116 may be configured to determine the first pressure of the pressurized air within the conduit(s) 32 based on the received first pressure sensor data.

Moreover, as shown in FIG. 7, at (306), the method 300 may include receiving, with the computing system, second pressure sensor data indicative of a second pressure of pressurized air within a tank of the agricultural implement. For instance, as described above, the computing system 116 may be configured to receive second pressure sensor data indicative of the second pressure of the pressurized air within the tank(s) 30 from the second pressure sensor 112.

Furthermore, at (308), the method 300 may include determining, with the computing system, the second pressure of the pressurized air within the tank based on the received second pressure data. For instance, as described above, the computing system 116 may be configured to determine the second pressure of the pressurized air within the tank(s) 30 based on the received second pressure data.

In addition, as shown in FIG. 7, at (310), the method 300 may include determining, with the computing system, a pressure differential between the first and second pressures. For instance, as described above, the computing system 116 may be configured to determine the pressure differential(s) between the first and second pressures.

Moreover, at (312), the method 300 may include controlling, with the computing system, a flow of the pressurized air supplied to the tank based on the determined pressure differential. For instance, as described above, the computing system 116 may be configured to control the operation of the tank fan(s) 104 and/or the valve(s) 106 to adjust or otherwise control the flow(s) of the pressurized air supplied to the tank(s) 30 based on the determined pressure differential(s).

It is to be understood that the steps of the control logic 200 and the method 300 are performed by the computing system 116 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 116 described herein, such as the control logic 200 and the method 300, is implemented in software code or instructions which are tangibly stored on a tangible computer readable medium. The computing system 116 loads the software code or instructions via a direct interface with the computer readable medium or via a wired and/or wireless network. Upon loading and executing such software code or instructions by the computing system 116, the computing system 116 may perform any of the functionality of the computing system 116 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling fan operation of an agricultural implement, the system comprising:
   a tank configured to store an agricultural product;
   a conduit configured to receive the agricultural product dispensed from the tank;
   a conduit fan configured to supply pressurized air to the conduit such that the pressurized air conveys the dispensed agricultural product through the conduit;
   a tank fan configured to supply pressurized air to the tank;
   a first pressure sensor configured to capture data indicative of a first pressure of the pressurized air within the conduit;
   a second pressure sensor configured to capture data indicative of a second pressure of the pressurized air within the tank; and
   a computing system communicatively coupled to the first and second pressure sensors, the computing system configured to:
      receive an input indicative of at least one of a fill level of the agricultural product within the tank, a type of the agricultural product stored within the tank, a metering rate at which the agricultural product is dispensed from the tank, a volume of the tank, or a shape of the tank;

determine the first pressure of the pressurized air within the conduit based on the data captured by the first pressure sensor;

determine the second pressure of the pressurized air within the tank based on the data captured by the second pressure sensor;

determine a pressure differential between the first and second pressures; and control a flow of the pressurized air supplied to the tank based on the determined pressure differential and the at least one of the fill level of the agricultural product within the tank, the type of the agricultural product stored within the tank, the metering rate at which the agricultural product is dispensed from the tank, the volume of the tank, or the shape of the tank.

2. The system of claim 1, wherein, when controlling the flow of the pressurized air, the computing system is further configured to:

compare the determined pressure differential to a predetermined range; and when the determined pressure differential falls outside of the predetermined range, initiate an adjustment to the flow of the pressurized air supplied to the tank.

3. The system of claim 1, wherein, when controlling the flow of the pressurized air, the computing system is further configured to control fan operation of the tank fan based on the determined pressure differential and the at least one of the fill level of the agricultural product within the tank, the type of the agricultural product stored within the tank, the metering rate at which the agricultural product is dispensed from the tank, the volume of the tank, or the shape of the tank.

4. The system of claim 1, further comprising:

a valve configured to control the flow of the pressurized air supplied by the tank fan to the tank, wherein, when controlling the flow of the pressurized air, the computing system is further configured to control an operation of the valve based on the determined pressure differential and the at least one of the fill level of the agricultural product within the tank, the type of the agricultural product stored within the tank, the metering rate at which the agricultural product is dispensed from the tank, the volume of the tank, or the shape of the tank.

5. The system of claim 1, further comprising:

a fill level sensor configured to capture data indicative of the fill level of the agricultural product within the tank, wherein computing system is communicatively coupled the fill level sensor, the computing system further configured to:

determine the fill level of the agricultural product within the tank based on the data captured by the fill level sensor; and control the flow of the pressurized air supplied to the tank based on the determined fill level and the determined pressure differential.

6. The system of claim 1, wherein the computing system is further configured to:

receive an input indicative of the type of the agricultural product stored within the tank; and control the flow of the pressurized air supplied to the tank based on the the type of the agricultural product and the determined pressure differential.

7. The system of claim 1, wherein the computing system is further configured to:

receive an input indicative of the metering rate at which the agricultural product is dispensed from the tank; and control the flow of the pressurized air supplied to the tank based on the metering rate at which the agricultural product is dispensed from the tank and the determined pressure differential.

8. The system of claim 1, wherein the computing system is further configured to:

receive an input indicative of the volume of the tank; and control the flow of the pressurized air supplied to the tank based on the volume of the tank and the determined pressure differential.

9. The system of claim 1, wherein the computing system is further configured to:

receive an input indicative of the shape of the tank; and control the flow of the pressurized air supplied to the tank based on the shape of the tank and the determined pressure differential.

10. The system of claim 1, wherein the tank corresponds to a first tank configured to store a first agricultural product, the conduit corresponds to a first conduit, and the tank fan corresponds to a first tank fan, the system further comprising:

a second tank configured to store a second agricultural product;

a second conduit configured to receive the dispensed second agricultural product from the second tank such that the pressurized air supplied by the conduit fan conveys the dispensed second agricultural product through the second conduit; and a second tank fan configured to supply pressurized air to the second tank.

11. The system of claim 1, wherein the tank corresponds to a first tank configured to store a first agricultural product and the conduit corresponds to a first conduit, the system further comprising:

a second tank configured to store a second agricultural product and receive the pressurized air supplied by the tank fan;

a second conduit configured to receive the dispensed second agricultural product such that the pressurized air supplied by the conduit fan conveys the dispensed second agricultural product through the second conduit;

a first valve configured to control the flow of the pressurized air from the tank fan to the first tank; and a second valve configured to control a flow of the pressurized air from the tank fan to the second tank.

12. The system of claim 11, wherein the first and second valves are independently controllable.

13. A method for controlling fan operation of an agricultural implement, the agricultural implement including a tank configured to store an agricultural product, a conduit configured to receive the agricultural product dispensed from the tank, and a conduit fan configured to supply pressurized air to the conduit such that the pressurized air conveys the dispensed agricultural product through the conduit, the agricultural implement further including a tank fan configured to supply pressurized air to the tank, the method comprising:

receiving, with a computing system, an input indicative of at least one of a fill level of the agricultural product within the tank, a type of the agricultural product stored within the tank, a metering rate at which the agricultural product is dispensed from the tank, a volume of the tank, or a shape of the tank;

receiving, with the computing system, first pressure sensor data indicative of a first pressure of the pressurized air within the conduit;

determining, with the computing system, the first pressure of the pressurized air within the conduit based on the received first pressure sensor data;

receiving, with the computing system, second pressure sensor data indicative of a second pressure of the pressurized air within the tank;

determining, with the computing system, the second pressure of the pressurized air within the tank based on the received second pressure data;

determining, with the computing system, a pressure differential between the first and second pressures; and controlling, with the computing system, a flow of the pressurized air supplied to the tank based on the determined pressure differential and the at least one of the fill level of the agricultural product within the tank, the type of the agricultural product stored within the tank, the metering rate at which the agricultural product is dispensed from the tank, the volume of the tank, or the shape of the tank.

14. The method of claim 13, wherein controlling the flow of the pressurized air further comprises:
comparing, with the computing system, the determined pressure differential to a predetermined range; and
when the determined pressure differential falls outside of the predetermined range, initiating, with the computing system, an adjustment of the flow of the pressurized air supplied to the tank.

15. The method of claim 13, further comprising:
receiving, with the computing system, fill level sensor data indicative of the fill level of the agricultural product within the tank; and
determining, with the computing system, the fill level of the agricultural product within the tank based on the data captured by the fill level sensor,
wherein controlling the flow of the pressurized air supplied to the tank further comprises controlling, with the computing system, the flow of the pressurized air supplied to the tank based on the determined fill level and the determined pressure differential.

16. The method of claim 13, further comprising:
receiving, with the computing system, an input indicative of the type of the agricultural product stored within the tank,
wherein controlling the flow of the pressurized air supplied to the tank further comprises controlling, with the computing system, the flow of the pressurized air supplied to the tank based on the type of the agricultural product stored within the tank and the determined pressure differential.

17. The method of claim 13, further comprising:
receiving, with the computing system, an input indicative of the metering rate at which the agricultural product is dispensed from the tank,
wherein controlling the flow of the pressurized air supplied to the tank further comprises controlling, with the computing system, the flow of the pressurized air supplied to the tank based on the the metering rate at which the agricultural product is dispensed from the tank and the determined pressure differential.

18. The method of claim 13, further comprising:
receiving, with the computing system, an input indicative of the volume of the tank; and
wherein controlling the flow of the pressurized air supplied to the tank further comprises controlling, with the computing system, the flow of the pressurized air supplied to the tank based on the the volume of the tank and the determined pressure differential.

19. An agricultural implement, comprising:
a tank configured to store an agricultural product;
a conduit configured to receive the agricultural product dispensed from the tank;
a conduit fan configured to supply pressurized air to the conduit such that the pressurized air conveys the dispensed agricultural product through the conduit and to supply the pressurized air to the tank;
a valve configured to control a flow of the pressurized air from the conduit fan to the tank;
a first pressure sensor configured to capture data indicative of a first pressure of the pressurized air within the conduit;
a second pressure sensor configured to capture data indicative of a second pressure of the pressurized air within the tank; and
a computing system communicatively coupled to the first and second pressure sensors, the computing system configured to:
receive an input indicative of at least one of a fill level of the agricultural product within the tank, a type of the agricultural product stored within the tank, a metering rate at which the agricultural product is dispensed from the tank, a volume of the tank, or a shape of the tank;
determine the first pressure of the pressurized air within the conduit based on the data captured by the first pressure sensor;
determine the second pressure of the pressurized air within the tank based on the data captured by the second pressure sensor;
determine a pressure differential between the first and second pressures; and
control an operation of the valve to adjust the flow of the pressurized air supplied to the tank based on the determined pressure differential and the at least one of the fill level of the agricultural product within the tank, the type of the agricultural product stored within the tank, the metering rate at which the agricultural product is dispensed from the tank, the volume of the tank, or the shape of the tank.

20. The agricultural implement of claim 19, wherein the tank corresponds to a first tank configured to store a first agricultural product, the conduit corresponds to a first conduit, and the valve corresponds to a first valve, the agricultural implement further comprising:
a second tank configured to store a second agricultural product and receive the pressurized air supplied by the conduit fan;
a second conduit configured to receive the dispensed second agricultural product such that the pressurized air supplied by the conduit fan conveys the dispensed second agricultural product through the second conduit;
a second valve configured to control a flow of the pressurized air from the conduit fan to the second tank.

* * * * *